(12) United States Patent
Thesling

(10) Patent No.: US 7,426,242 B2
(45) Date of Patent: Sep. 16, 2008

(54) ORTHOGONAL FREQUENCY DIGITAL MULTIPLEXING CORRELATION CANCELLER

(75) Inventor: William H. Thesling, Bedford, OH (US)

(73) Assignee: ViaSat, Inc., Carlsbad, CA (US)

( * ) Notice: Subject to any disclaimer, the term of this patent is extended or adjusted under 35 U.S.C. 154(b) by 883 days.

(21) Appl. No.: 10/910,868

(22) Filed: Aug. 4, 2004

(65) Prior Publication Data

US 2005/0030888 A1   Feb. 10, 2005

Related U.S. Application Data

(60) Provisional application No. 60/492,412, filed on Aug. 4, 2003.

(51) Int. Cl.
*H04L 25/03* (2006.01)
(52) U.S. Cl. .................. 375/296; 375/144; 375/146; 375/285; 370/203; 370/465; 370/482; 370/497; 455/114.2; 455/115.1

(58) Field of Classification Search ................. 375/144, 375/146, 260, 285, 295, 296, 298; 370/203, 370/206, 464, 465, 482, 497; 455/46, 59, 455/91, 103, 104, 109, 114.2, 114.3, 115.1
See application file for complete search history.

(56) References Cited

U.S. PATENT DOCUMENTS

| 4,185,168 | A | 1/1980 | Graupe et al. | |
|---|---|---|---|---|
| 6,289,309 | B1 | 9/2001 | deVries | |
| 6,754,340 | B1 | 6/2004 | Ding | |
| 6,763,061 | B1 | 7/2004 | Strait et al. | |
| 7,023,929 | B2 * | 4/2006 | Mujica et al. | ............... 375/260 |
| 7,085,314 | B2 * | 8/2006 | Zhu et al. | ................... 375/214 |
| 2003/0207669 | A1 | 11/2003 | Kroeger | |

* cited by examiner

*Primary Examiner*—Dac V Ha
(74) *Attorney, Agent, or Firm*—Townsend and Townsend and Crew LLP

(57) ABSTRACT

A correlation canceller modulates a communication signal over a plurality of channels and an epoch aperture by a plurality of interference response signals corresponding to linear response by one or more filtering effects to generate an inversely correlated communication signal.

32 Claims, 7 Drawing Sheets

ORTHOGONAL FREQUENCY DIGITAL MULTIPLEXING CORRELATION CANCELLER

The application claims the benefit of U.S. Provisional Application Ser. No. 60/492,412, filed Aug. 4, 2003, entitled "OFDM Correlation Canceller," the entire disclosure of which is incorporated herein by reference.

The disclosure in general relates to communication signal processing systems, and in particular relates to the addition of inverted interference signals to facilitate digital filtering.

Communication systems typically implement one or more digital modulation schemes. For example, many communication systems use an Orthogonal Frequency Digital Multiplexing (OFDM) modulation format. The OFDM modulation format supports multiple communication channels, and a 16-channel OFDM waveform is commonly implemented in satellite systems.

The 16-channel OFDM modulation format generates side lobe energy, as do nearly all other modulation formats. The side lobe components of the OFDM waveform are needed to maintain orthogonality. The side lobe energy of the OFDM spectrum, however, extends beyond the signal bandwidth typically allotted for a carrier waveform and may interfere with waveforms in adjacent frequency bands, causing adjacent channel interference (ACI). Thus, the side lobes are removed at the transmitter by a FIR filter to eliminate nearly all the side lobe energy and to limit the total bandwidth of the OFDM signal to a "null-to-null" bandwidth. Removal of the side lobes, however, compromises the orthogonal property of the OFDM waveform, causing inner symbol interference (ISI). This interference results in a higher noise floor (or Es/No ceiling), which, in turn, limits the system performance of each channel. The degradation appears as implementation loss, and may be particularly high when using high order modulation on the outer channels.

The digital filtering correlates the symbols in time and across channels, which results in a self-interference within the modulated waveform. A novel correlation canceller is disclosed herein that adds the inverse of this interference a priori. The inverse of the interference may be obtained based on known symbols for each channel within the transmitter. In one example embodiment, the correlation canceller modulates a processed data signal over a plurality of channels and an epoch aperture by a plurality of interference response signals corresponding to a digital filter transfer function to generate an inversely correlated communication signal.

DRAWINGS

Figure 9A:
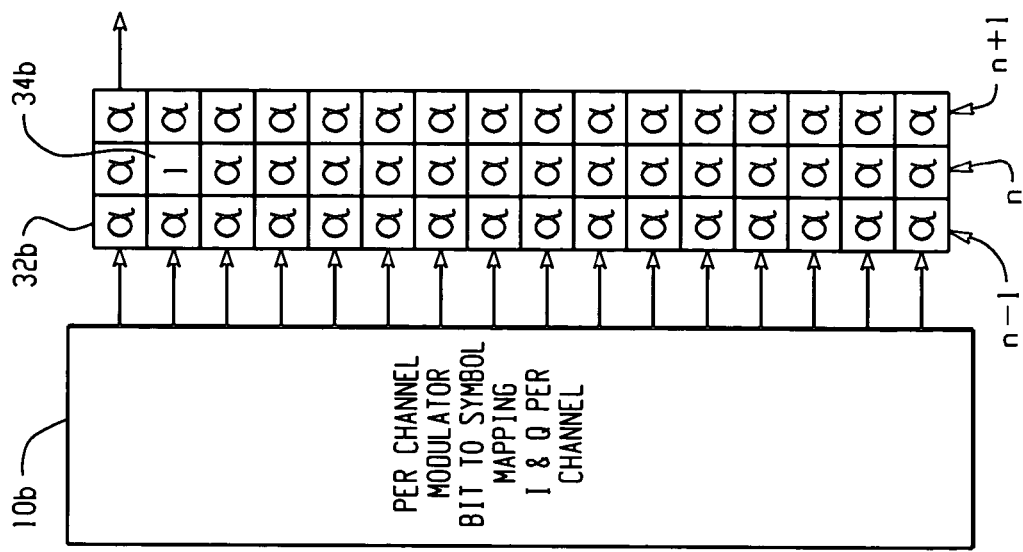
Figure 9B:
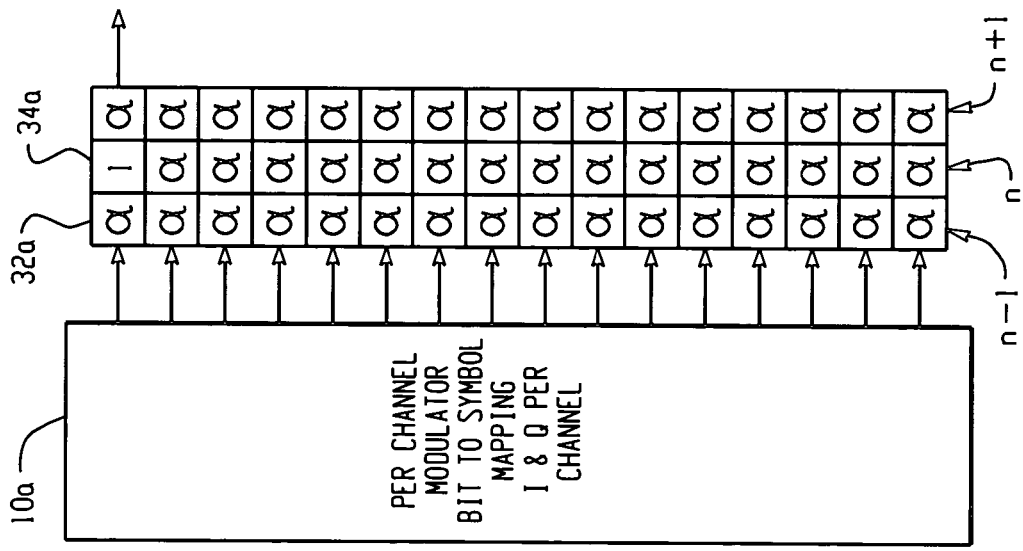
Figure 10:
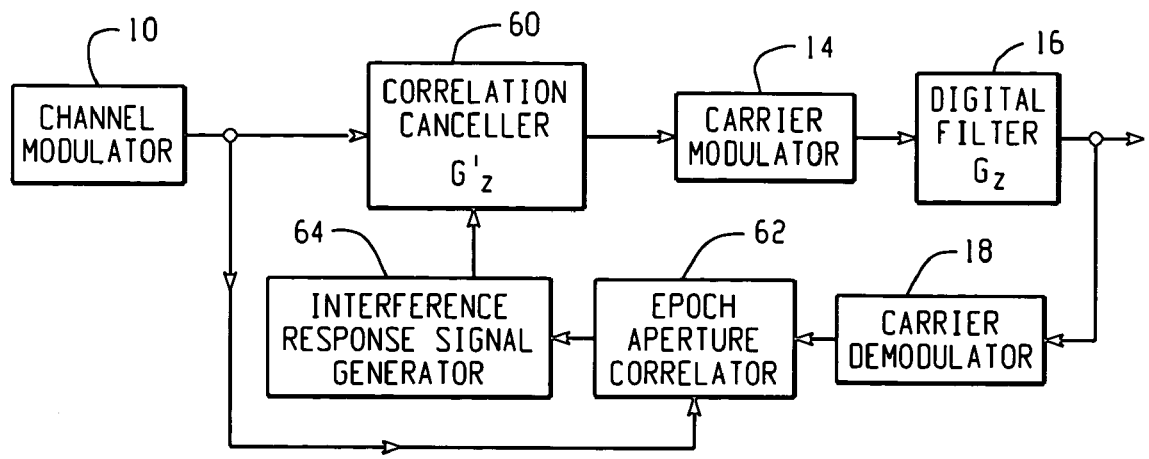
Figure 11:
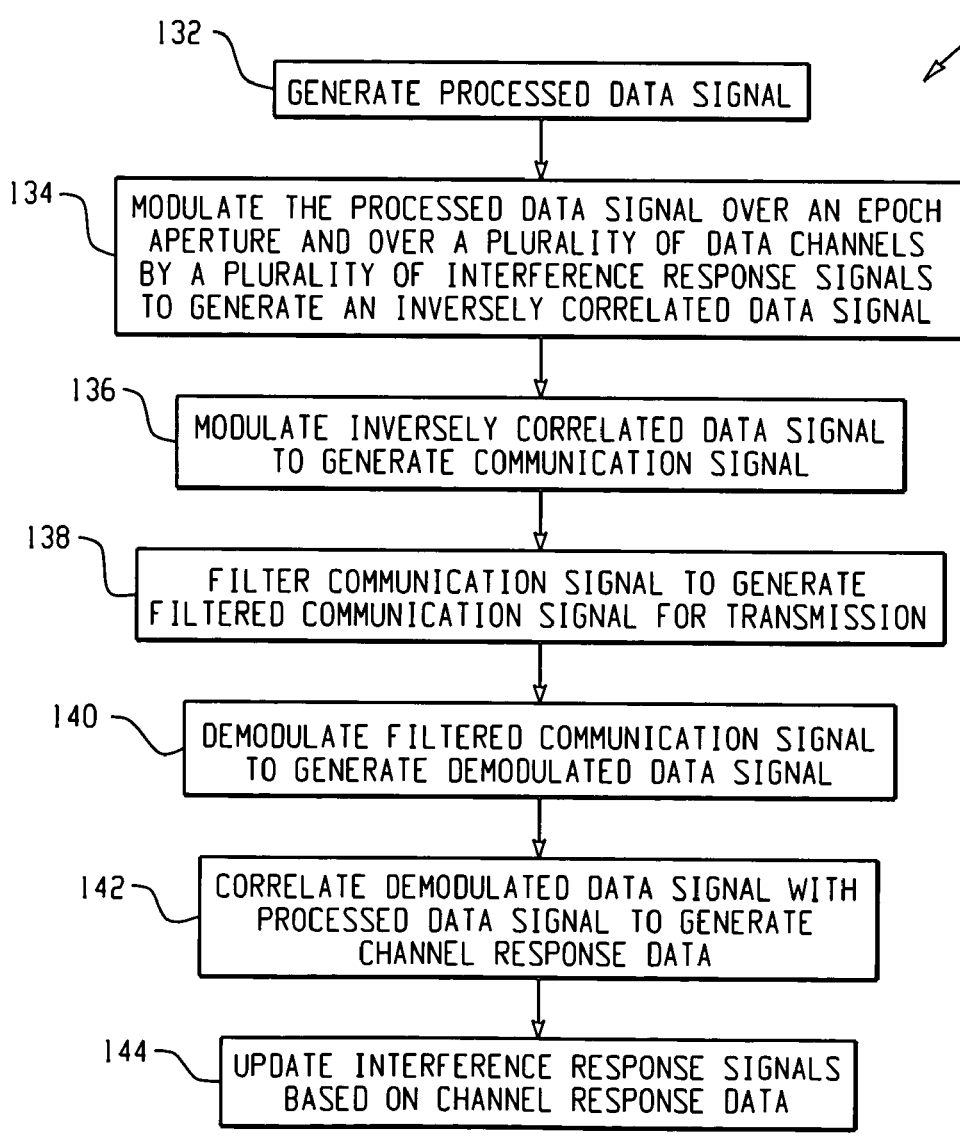

FIGS. 9(a) and 9(b) are illustrative correlation canceller input filters for two communication channels;

FIG. 10 is a block diagram of another embodiment of a system for generating a modulated and filtered communication signal; and FIG. 11 a flow diagram illustrating a method of generating interference response signals carried out by the system of FIG. 10.

DETAILED DESCRIPTION

Figure 1:
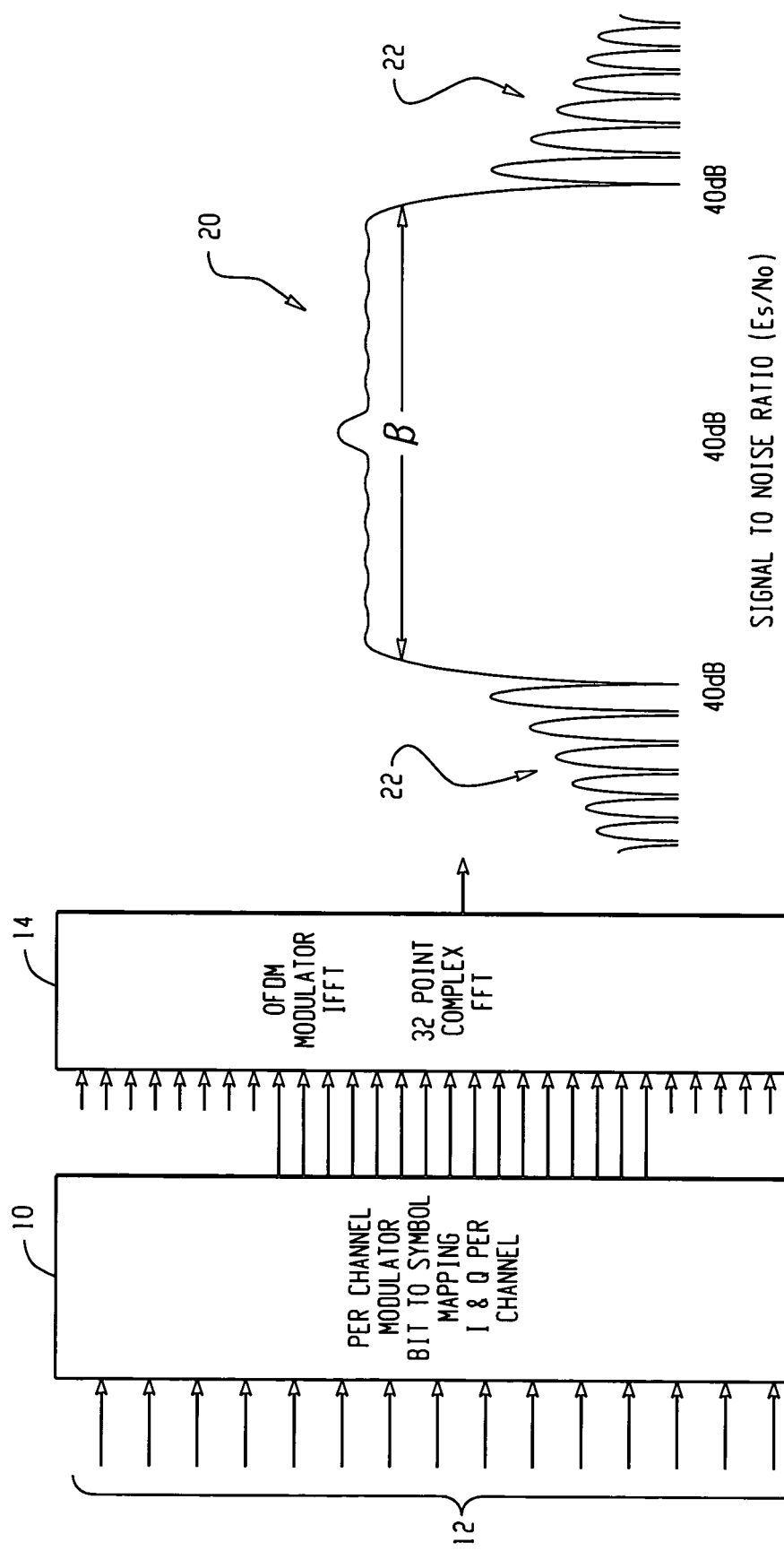
FIG. 1 is a block diagram of a system for generating a modulated and unfiltered communication signal.

FIG. 1 is a block diagram of a system for generating a modulated and unfiltered communication signal 20. A channel modulator 10 receives input bit streams 12 for a plurality of data channels and modulates the input bit streams 12 on each channel to produce a corresponding processed data signal comprising in-phase and quadrature components. In the example shown in FIG. 1, the channel modulator 10 modulates 16 data channels at a rate of 3.375 megasymbols per second (Msps). Other channel modulators having different specifications may also be used. The channel modulator 10 may comprise digital signal processing circuitry and/or software operable to encode the digital data into the in-phase and quadrature components. Examples of such circuitry and/or software include a field programmable gate array (FPGA), an application specific integrated circuit (ASIC), or a computer processor operable to execute processor-executable instructions.

A carrier modulator 14 receives the processed data signal from the channel modulator 10 and modulates the processed data signal to produce a communication signal. The communication signal may then be provided to a transmitter for transmission. In the example shown in FIG. 1, the carrier modulator 14 is an OFDM modulator that performs a 32 point complex fast Fourier transform (FFT). In this example the data is FEC encoded via turbo codes, and the output waveform is referred to as a "Turbo-encoded Orthogonal L-Band L-Code" (or a "TOLL") communication signal 20. Other carrier modulators having different specifications may also be used, such as BPSK, QPSK, M-ary PSK, or other such modulation formats, with or without FEC encoding. The carrier modulator 14 may comprise digital signal processing circuitry and/or software operable to perform such carrier modulation. Examples of such circuitry and/or software include a FPGA, an ASIC, or a computer processor operable to execute processor-executable instructions.

The communication signal 20 comprises the 16 multiple channels of the processed data signal, each of which is at a symbol rate of 3.375 Msps. The sixteen channels are multiplexed together, generating a 54 Msps band signal. Thus, the bandwidth β of the communication signal 20 is 54 MHz.

In the example shown, the TOLL communication signal has a very high signal-to-noise ratio (Es/No) of 40 dB for each channel. This high Es/No value is seen in the TOLL waveform 20 prior to filtering by a digital filter and transmission, and is due in part to demodulation in the presence of the side lobes 22 appearing outside of the 54 MHz band. In a practical system, however, the bandwidth available for a communication signal is limited. For example, the waveform 20 may be one of a plurality of communication signals that are adjacently positioned along the frequency spectrum. Accordingly, because the side lobes 22 are outside of the 54 MHz band of the TOLL waveform, they may cause adjacent channel interference (ACI) in the communication signals in adjacent bands. Thus, prior to transmission, the communication signal 20 is filtered by a digital filter to suppress the side lobes 22.

Figure 2:
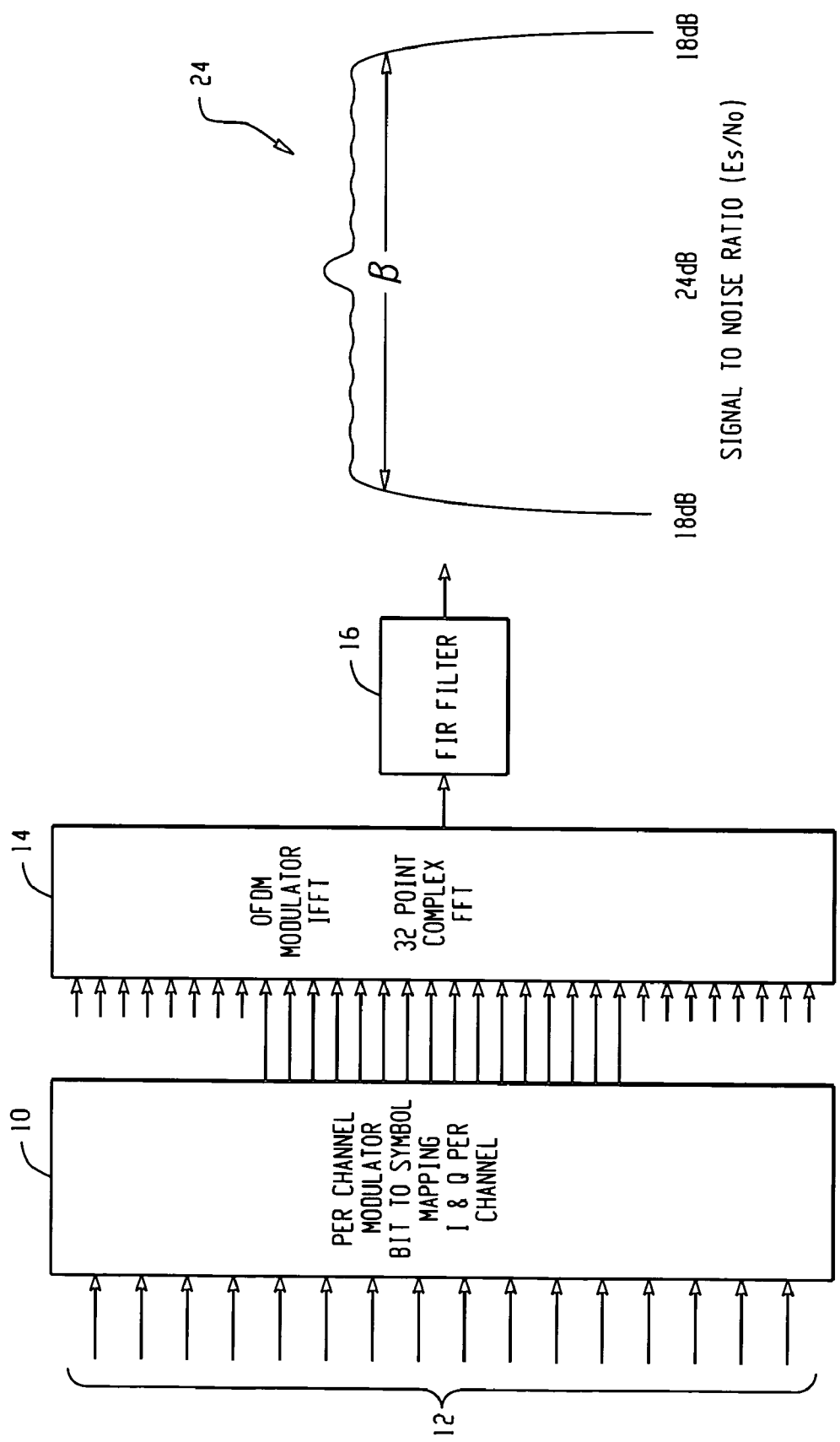
FIG. 2 is a block diagram of a system for generating a modulated and filtered communication signal.

FIG. 2 is a block diagram of a system for generating a modulated and filtered communication signal 24. The channel modulator 10 and the carrier modulator 14 are the same as described in FIG. 1. The system of FIG. 2, however, includes an example finite impulse response (FIR) filter 16. Other types of filters may also be used.

The FIR filter 16 eliminates the side lobes 22 of the communication signal 20 to generate the filtered communication signal 24 of FIG. 2. Because nearly all of side lobe energy outside of the 54 MHz band is eliminated, the filtered communication signal 20 generates less ACI than the communication signal 20. However, suppression of the side lobes 22 compromises the orthogonality of the communication signal 20, which in turn results in inner symbol interference (ISI). As a result, the effective Es/No of the filtered communication signal is lowered to about 18 dB at the outer channels.

In general, the Es/No ceiling is indicative of an implementation loss, and raising the Es/No ceiling mitigates the implementation loss. The amount of the implementation loss depends on the modulation and coding used. For example, if a rate 1/3 code with QPSK is used on the outer channels of the filtered communication signal 24, the implementation loss may be less then 0.1 dB and can easily be neglected. However, if an 8-ary modulation and a high rate code (such as the $(128,120)^2$ turbo product code) is used, then the implementation loss increases to approximately 0.7 dB. When other impairments are included, the difference in implementation loss when using the FIR filter 16 as compared to not using the FIR filter 16 can easily exceed 1.0 dB. Even on the inner channels, near the center frequency, the implementation loss can approach nearly 0.5 dB when the higher code rate codes and 8-ary modulation are used.

Figure 3:
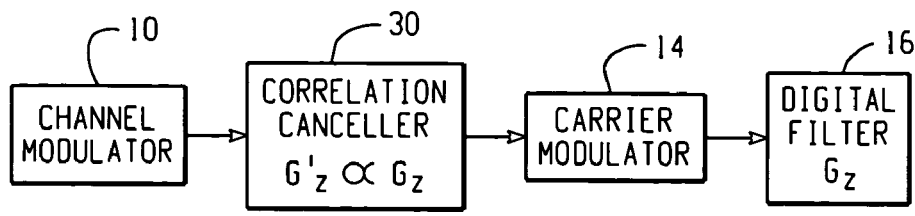
FIG. 3 is a block diagram of a system for providing a priori conditioning of a communication signal.

The system degradation caused by the filtering of the communication signal can be minimized by evaluating a self-interference caused by the inclusion of the filter and adding an inverse of this interference a priori. FIG. 3 is a block diagram of a system for providing a priori conditioning of a communication signal. The example channel modulator 10, carrier modulator 14, and digital filter 16 are as described with respect to FIGS. 1 and 2 above.

A correlation canceller 30 is interposed between the channel modulator 10 and the carrier modulator 14. The correlation canceller 30 includes a plurality of interference response signals corresponding to the transfer function Gz of the digital filter 16. The interference response signals define an epoch aperture over which the in-phase and quadrature data are received. The epoch aperture is typically symmetric about an on-time received symbol, e.g., the epoch aperture may define the time t=−n, −n+1 . . . n over which in-phase and quadrature data signals are received. Thus, the transfer function of the correlation canceller 30 may be characterized as G'z. The correlation canceller 30 is operable to modulate the processed data signal from the channel modulator 10 over the plurality of channels and the epoch aperture prior to digital filtering by the digital filter 16 to generate an inversely correlated data signal. In the example system shown in FIG. 3, the inversely correlated data signal is received by the carrier modulator 14, which then modulates the inversely correlated data signal to generate a communication signal. The communication signal is then filtered by the digital filter 16.

In general, FIR filtering of a communication signal correlates symbols in time and across the channels, which results in self-interference across the channels. By filtering a processed data signal with known data, such as data stream representing a test tone or a response to an impulse function, the channel responses to the self-interference caused by the FIR filter may be evaluated. The inverse of this self-interference may be characterized as interference response signals that can be added into the processed data signal a priori to minimize the effect of the self-interference caused by the correlation in the FIR filter. Accordingly, the addition of the interference response signals results is a degree of correlation cancellation relative to the self-interference.

The correlation canceller 30 may comprise digital signal processing circuitry and/or software operable to perform such carrier modulation. Examples of such circuitry and/or software include a FPGA, an ASIC, or a computer processor operable to execute processor-executable instructions.

Figure 4:
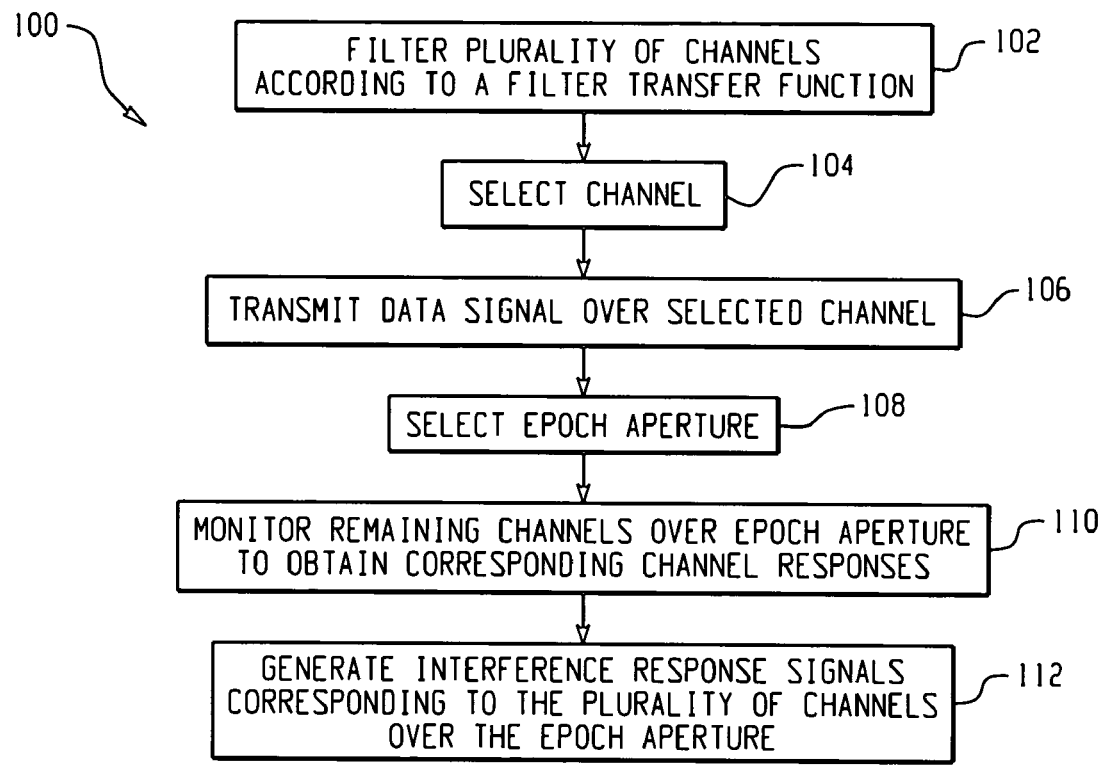
FIG. 4 is flow diagram illustrating a method of a priori conditioning of a communication signal.
Figure 5:
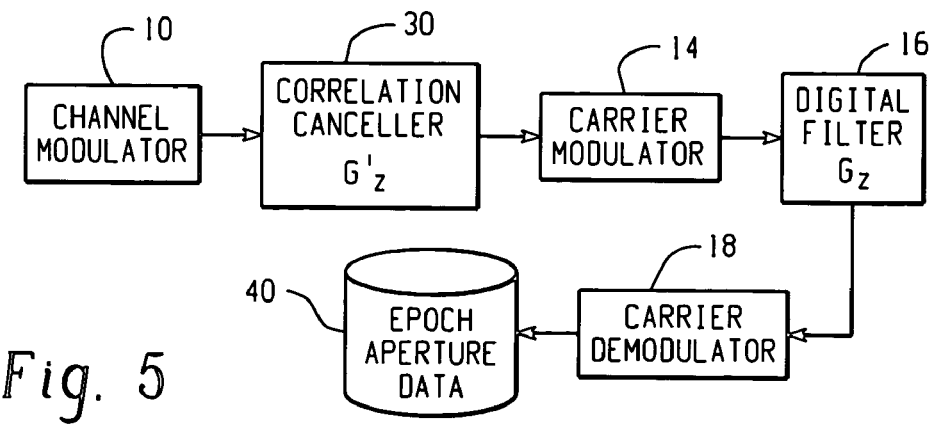
FIG. 5 is a block diagram of a system for monitoring epoch aperture data.

FIG. 4 is flow diagram 100 illustrating a method of a priori conditioning of a communication signal. The process of FIG. 4 may be carried out to generate the interference response signals utilized by the correlation canceller 30 of FIG. 3. An example system implementing the process of FIG. 4 is shown in FIG. 5, which depicts a system for monitoring epoch aperture data.

Step 102 filters a plurality of channels according to a filter transfer function, and step 104 selects one of the data channels. Step 106 transmits a data signal over the selected channel. The data signal may be a known value, such as a tonal that generates a known bit pattern for the in-phase and quadrature data.

Step 108 selects an epoch aperture for monitoring. The size of the epoch aperture may be selected according to the processing capabilities available, and also according to the acceptable amount of self-interference mitigation desired or required. In one embodiment, an epoch aperture of three (i.e., n−1, n, and n+1, where n represents the on-time symbol) is selected.

Step 110 monitors the remaining plurality of channels over the epoch aperture to obtain corresponding channel response signals resulting from the transmission of the data signal over the selected channel. The channel response signals are the interference data on each remaining channel in response to the transmission of the data signal over the selected channel. As shown in FIG. 5, this step may be realized by using a demodulator 18 to demodulate the filtered communication signal output by the digital filter 16. The epoch aperture data 40 are stored in a data store, such as a memory device.

Steps 102, 104, 106, 108 and 110 are then repeated for each channel in the processed data signal. After each channel has been selected and the corresponding epoch aperture data 40 collected, a measure of the self-interference across each channel for the epoch aperture is obtained. Step 112 then inverts the channel response signals to obtain interference response signals corresponding to the plurality of channels over the epoch aperture.

In one embodiment, the in-phase and quadrature components of each channel are evaluated separately and the corresponding channel response signals comprise real data. In this embodiment, the resulting interference response signals are the negative of the channel response signals. In another embodiment, the complex channel response data may be monitored and used to generate the corresponding interference response signals.

Figure 6:
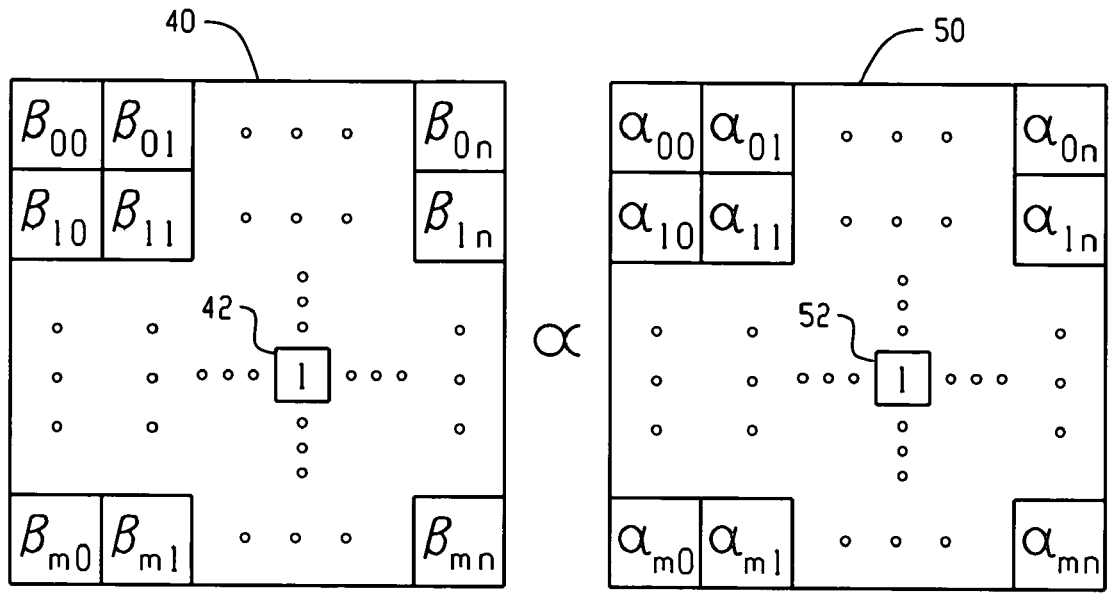
FIG. 6 is a block diagram of epoch aperture data and corresponding interference response signals.

FIG. 6 is a block diagram of epoch aperture data 40 and corresponding interference response signals 50 for a single channel corresponding to the unity value 42. The example epoch aperture data 40 defines an epoch aperture of n received channel responses over m modulated channels. An inversion operation, such as multiplying the n received channel responses by −1, may be used to generate the corresponding interference response signals 50. The unity value 42, however, is not inverted, as represented by the unity value 52 in the interference response signals 50. This is to prevent cancellation of the actual data transmitted over a channel.

Figure 7:
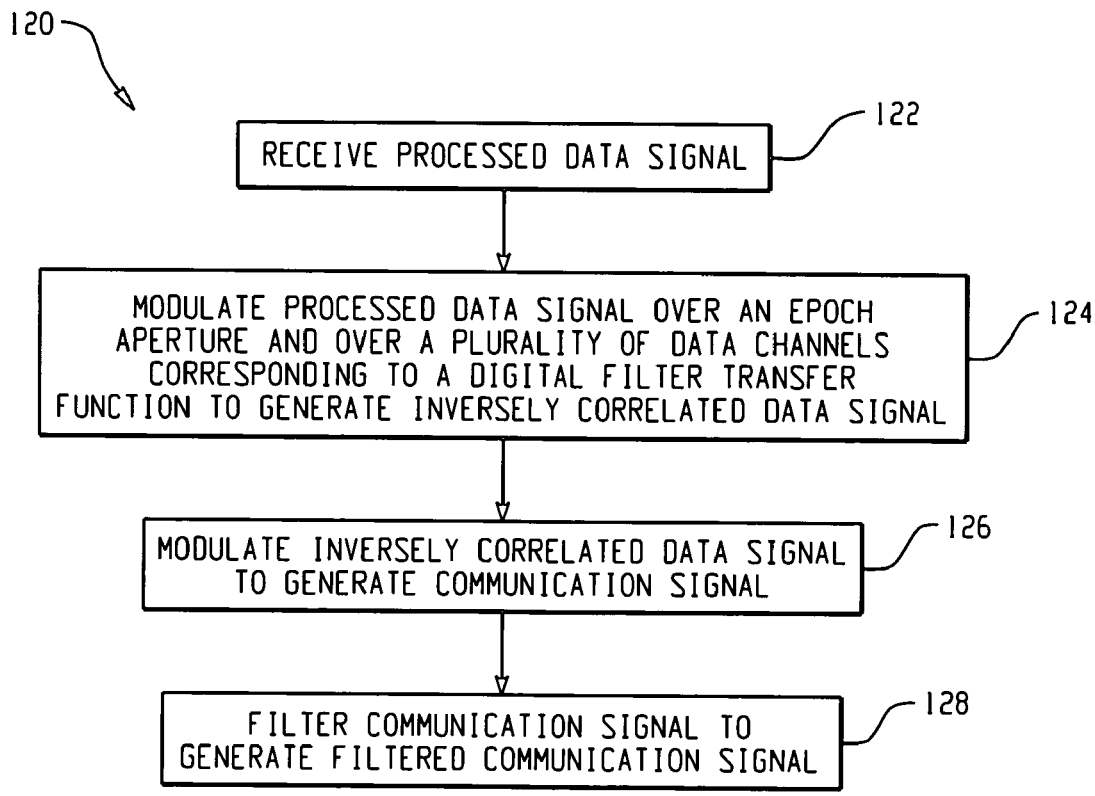
FIG. 7 is a flow diagram illustrating a method of generating a filtered communication signal modulated by interference response signals.

FIG. 7 is a flow diagram 120 illustrating a method of generating a filtered communication signal modulated by interference response signals. The system of FIG. 3 may be used to implement the process of FIG. 7. In step 122, the correlation canceller 30 receives a processed data signal from the channel modulator 10. In step 124, the correlation canceller 30 modulates the processed data signal over the plurality of channels and the epoch aperture prior to digital filtering to generate an inversely correlated data signal. The correlation canceller 30 modulates the processed data signal by the interference response signals. In step 126, the inversely correlated data signal is modulated by the carrier modulator 14 to generate a communication signal. The communication signal is then filtered by the digital filter 16 to generate a filtered communication signal in step 128.

Figure 8:
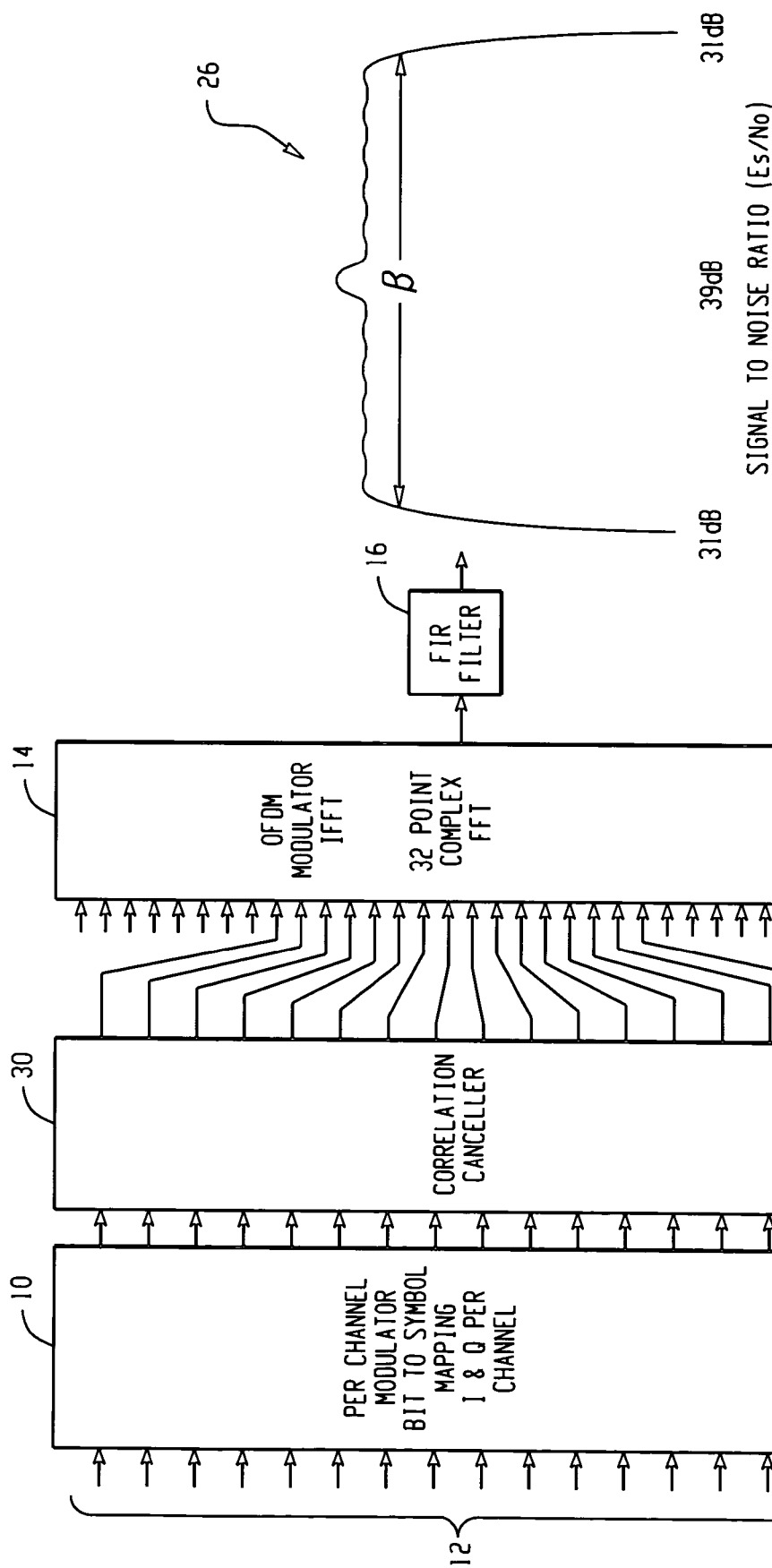
FIG. 8 is a block diagram of an example correlation canceller system for generating a modulated and filtered communication signal.

FIG. 8 is a block diagram of an example correlation canceller system for generating a modulated and filtered communication signal 26. The channel modulator 10, carrier modulator 14, and the FIR filter 16 are the same as described in FIG. 2. The system of FIG. 8, however, includes a correlation canceller 30 interposed between the channel modulator 10 and the carrier modulator 14.

The example system of FIG. 8 is described with reference to a filtered 2-channel (channel 0 and channel 1) OFDM waveform using the FIR filter 16 with a 2-symbol aperture. Each channel carries an I and a Q value for a total of 4 variables—one I and Q per channel—received at any time n. Due to the FIR filtering by the FIR filter 16, the channel 0 in-phase term I at the receiver can be written as:

$$I_{Rec,0,n} = c_{0I,0I,0}I_{0,n} + c_{0I,0I,-1}I_{0,n-1} + c_{0I,0I,+1}I_{0,n+1} + c_{0I,0I,-2}I_{0,-2} +$$
$$c_{0I,0I,+2}I_{0,n+2} + c_{0I,0Q,0}Q_{0,n} + c_{0I,0Q,-1}Q_{0,n-1} + c_{0I,0Q,+1}Q_{0,n+1} +$$
$$c_{0I,0Q,-2}Q_{0,-2} + c_{0I,0Q,+2}Q_{0,n+2}$$
$$= c_{0I,1I,0}I_{1,n} + c_{0I,0I,-1}I_{1,n-1} + c_{0I,1I,+1}I_{1,n+1} + c_{0I,1I,-2}I_{1,-2} +$$
$$c_{0I,1I,+2}I_{1,n+2} + c_{0I,1Q,0}Q_{1,n} + c_{0I,1Q,-1}Q_{1,n-1} + c_{0I,1Q,+1}Q_{1,n+1} +$$
$$c_{0I,1Q,-2}Q_{1,-2} + c_{0I,1Q,+2}Q_{1,n+2}$$

where:

$I_{Rec,0,n}$=the in-phase value received on channel 0 at time n; and $C_{ChX,M,ChYN \ldots -\alpha}$=the correlation of the $N^{th}$ term of channel Y at time n–α on the $M^{th}$ term of channel X at time n, where N and M∈(I,Q).

For channel 0, there are 20 terms for just the received in-phase term. Similarly, there are 20 terms for the quadrature term of channel zero, the in-phase term of channel 1, and the quadrature term of channel 1. In an ideal system, the first coefficient ($c_{0I,0I,0}$) for each received signal is 1 and all other coefficients are zero.

The FIR filtering by the digital filter 16, however, causes interference resulting in the additional terms being non-zero. Each of these other terms is typically small relative to the first coefficient ($c_{0I,0I,0}$) but the RMS sum of all 20 becomes significant.

In a system implementing a TOLL waveform, there are 16 channels and the aperture of the FIR filter 16 is approximately three symbols. Thus, for each of the in-phase and quadrature values (16 I and 16 Q) there are 7×32=224 terms, or 223 additional terms. Accordingly, the correlation canceller 30 calculates the sum of the 223 additional terms and subtracts this value from the modulated symbol. If calculated for each symbol, the correlation canceller 30 generates 223×32=7136 terms per symbol time of 3.375 Msps.

The coefficients c, however, are a function of the FIR filter 16. As a result, the coefficients c are a function of the number of channels used. For a system using a selected number of channels and a selected FIR filter 16, the coefficients c are constants. Multiply-accumulators may thus be implemented because each term in the above equation requires a multiply and these terms are added together. Thus, in the example embodiment of FIG. 8, the correlation canceller 30 has a similar characteristic of 32 FIR filters, each with 223 taps. Therefore, the total MAC operations per second of the correlation canceller is 7136×3.375 Msps=24 billion MAC operations per second. As a comparison, a typical FIR filter that may be used in the system of FIG. 8 may be implemented with 5 Billion MACs.

In another embodiment, the implementation requirements of the correlation canceller 30 can be reduced by minimizing the MAC operation requirements. For example, reducing the aperture size reduces the MAC operations required. The FIR filter 16 aperture results in 7 time periods per each symbol. As with most filters, however, the bulk of the signal energy is concentrated near the "on time" symbol. Thus, the three terms centered about the on-time symbol may be used to define an aperture that yields acceptable results. Therefore, for a time n, only the symbols at time n−1, n and n+1 are considered, and the remaining symbols are ignored. The total MAC operations are reduced to approximately 10.4 billion, which can be implemented in a FPGA or ASIC.

Utilization of an epoch aperture of n−1, n and n+1 in the correlation canceller 30 thus increases the minimum Es/No to approximately 31 dB at the outer channels, as shown by the filter communication signal 26 of FIG. 8. This Es/No level is sufficiently high that the implementation loss on any channel can generally be neglected.

FIGS. 9(a) and 9(b) are illustrative correlation canceller input filters 32a and 32b for two communication channels 10a and 10b. In the embodiment shown in FIGS. 9(a) and 9(b), the in-phase and quadrature values are represented together as a single complex number. For the first channel having the corresponding input filter 32a, the output is the weighted sum of the channel at time n, represented by the unity value of "1" for the interference response signal coefficient 34a, and all 16 channels at time n−1, n and n+1 as modulated by the remaining interference response signal α coefficients. Likewise, for the second channel having the corresponding input filter 32b, the output is the weighted sum of the channel at time n, represented by the unity value of "1" for the interference response signal coefficient 34b, and all 16 channels at time n−1, n and n+1 as modulated by the remaining interference response signal α coefficients.

The α values represent different complex weights and have a magnitude less than 1. The correlation canceller 30 thus operates to add in, a priori, the inverse of the correlation caused by the FIR filter 16. The result is that cross channel correlation seen at the receiver is minimized.

Because the correlation canceller 30 may be interposed between the channel modulator 10 and the carrier modulator 14, the systems and methods described herein may be readily implemented in existing communication systems. Additionally, if the FIR filter is changed or adjusted to have a different transfer characteristic, the interference response signals utilized by the correlation canceller 30 may be obtained by the analysis of the channel response data as described above with reference to FIGS. 4, 5 and 6. Finally, if the FIR filter 16 is removed from the system, or if the correlation canceller 30 is to be bypassed, all of the remaining interference response signals α may be set to 0.

FIG. 10 is a block diagram of another embodiment of a system for generating a modulated and filtered communication signal. In this embodiment, a plurality of interference response signals are generated by an epoch aperture correlator 62 and an interference response signal generator 64. The system of FIG. 10 provides for dynamic adjustment of a correlation canceller 60.

FIG. 11 a flow diagram 130 illustrating a method of generating interference response signals carried out by the system of FIG. 10. In step 132, the channel modulator generates a processed data signal. In step 134, the correlation canceller 60 modulates the processed data signal over an epoch aperture and over a plurality of data channels by a plurality of interference response signals to generate an inversely correlated data signal. In one embodiment, upon system initiation, the interference response signals are set to 0 for all channels except for the data channel, which is set to 1. Accordingly, the correlation canceller 60 initially passes the processed data signal unchanged.

In step 136, the inversely correlated data signal is modulated by the carrier modulator to generate a communication signal, and in step 138 the communication signal is filtered by the digital filter 16 to generate a filtered communication signal for transmission. The filtered communication signal may also be provided to a carrier demodulator 18, which demodulates the filtered communication signal to generate a demodulated data signal, in accordance with step 140.

In step 142, the demodulated data signal is correlated with the processed data signal by the epoch aperture correlator 62. The correlation of the processed data signal with the demodulated data signal over the epoch aperture generates a plurality of corresponding channel response data that are indicative of the self-interference cause by the digital filter 16. In one embodiment, the epoch aperture correlator 62 correlates over a given set of received symbols or over a given time period, e.g., 1,000,000 symbols, or every second.

In step 144, the interference response signals stored in the correlation canceller are updated based on the channel response data. An interference response signal generator 64 may be configured to invert the channel response signals to generate the interference response signals as described above with reference to FIGS. 3-9. In one embodiment, the interference response signal generator 64 is configured to periodically update the interference response signals used by the correlation canceller 60 based on the output frequency of the epoch aperture correlator 62, e.g., every 1,000,000 symbols, or every second.

In another embodiment, the epoch aperture correlator 62 performs an autocorrelation on the demodulated data signal over the epoch aperture, and does not correlate the demodulated data signal with the processed data signal. The autocorrelation on the demodulated data signal over the epoch aperture yields channel response data that is indicative of the self-interference caused by the digital filter 16, albeit the channel response data may be less accurate than if such data were obtained by a correlation of the processed data signal and the demodulated data signal.

The epoch aperture correlator 62 and the interference response signal generator 64 may comprise digital signal processing circuitry and/or software operable to perform the operations described herein. Examples of such circuitry and/or software include a FPGA, an ASIC, or a computer processor operable to execute processor-executable instructions.

The systems and methods described herein may be implemented in a transmitting device, such as in a satellite communication system uplink. Alternatively, the system may be distributed over a plurality of locations. For example, if a satellite downlink filter characteristic is known, a processed data signal may be conditioned as described herein prior to transmission to the satellite according to the interference response signals corresponding to the satellite downlink filter characteristics.

While the example systems and methods herein have been described with respect to applications for digital filtering and signal processing, the systems and methods described herein may also be applied to analog systems or digital systems with analog processing stages. Additionally, the system and methods described herein may also be applied to provide a priori conditioning for other linear system responses in addition to or separate from the linear system response of a filtering device. For example, a linear system response as measured from the output of the correlation canceller to the demodulated communication signal may be evaluated to generate corresponding interference response signals for use in the correlation canceller.

The embodiments described herein are examples of structures, systems or methods having elements corresponding, either literally or equivalently, to the elements of the invention recited in the claims. Additionally, the flow diagrams described herein, which describe particular methods and/or corresponding acts in support of steps, may also be utilized to implement corresponding software structures and algorithms, and equivalents thereof.

What is claimed is:

1. A method of a priori conditioning of a communication signal having a plurality of channels, comprising:
   transmitting a data signal over one of the plurality of channels in a first processed data signal;
   selecting an epoch aperture;
   digitally filtering the plurality of channels;
   monitoring the remaining plurality of channels over the epoch aperture to obtain corresponding channel response signals resulting from the transmission of the data signal over the one of the plurality of channels;
   generating interference response signals based on the channel response signals, the interference response signals corresponding to the plurality of channels over the epoch aperture; and
   modulating a second processed data signal by the interference response signals over the plurality of channels and the epoch aperture prior to digital filtering by a digital filter.

2. The method of claim 1, wherein generating interference response signals based on the channel response signals comprises inverting the channel response signals to obtain the interference response signals corresponding to the plurality of channels over the epoch aperture.

3. The method of claim 2, wherein digitally filtering the plurality of channels comprises filtering the plurality of channels through a finite impulse response (FIR) filter.

4. The method of claim 2, wherein transmitting a data signal over one of the plurality of channels in a first processed data signal comprises transmitting one of an in-phase or quadrature data signal over the one of the plurality of channels.

5. The method of claim 4, wherein the data signal comprises an impulse signal.

6. The method of claim 2, wherein inverting the channel response signals to obtain interference response signals cor-

9 responding to the plurality of channels over the epoch aperture comprises multiplying each channel response signal by a negative value.

7. The method of claim 1, wherein the data signal comprises an in-phase and quadrature communication signal, and wherein defining an epoch aperture comprises selecting a symbol aperture of n−1, n, and n+1.

8. The method of claim 7, wherein the communication signal comprises an orthogonal frequency digitally multiplexed (OFDM) signal.

9. The method of claim 1, wherein modulating a second processed data signal by the interference response signals over the plurality of channels and the epoch aperture prior to digital filtering by a digital filter comprises modulating the output of the one of the plurality of channels by unity at a selected time within the epoch aperture.

10. The method of claim 1, wherein the corresponding channel response signals comprise complex values.

11. The method of claim 1, wherein the corresponding channel response signals comprise real values.

12. A system for a priori conditioning of a communication signal having a plurality of channels, comprising:
a channel modulator operable to receive as input a plurality of data signals and modulate the data signals over a plurality of channels to generate a processed data signal having corresponding plurality of communication channels;
a correlation canceller comprising a data store storing a plurality of interference response signals corresponding to a digital filter transfer function, the plurality of interference response signals defining an epoch aperture, the correlation canceller operable to modulate the processed data signal over the plurality of channels and the epoch aperture prior to digital filtering to generate an inversely correlated data signal;
a carrier modulator operable to modulate the inversely correlated data signal to generate a communication signal; and
a digital filter operable to receive as input the communication signal and filter the communication signal according to the digital filter transfer function to generate a filtered communication signal.

13. The system of claim 12, wherein digital filter comprises a finite impulse response (FIR) filter.

14. The system of claim 13, wherein the processed data signal comprises in-phase and quadrature data signals.

15. The system of claim 14, wherein the epoch aperture defines a symbol aperture of n−1, n, and n+1.

16. The system of claim 12, wherein the interference response signals are based on channel response signals for the plurality of channels; the channel response signals responsive to an impulse signal transmitted over at least one of the plurality of channels.

17. The system of claim 16, wherein interference response comprises the channel response signals multiplied by a negative value.

18. The system of claim 16, wherein the correlation canceller is further operable to modulate the processed data signal by modulating the output of the one of the plurality of channels by unity at a selected time within the epoch aperture.

19. The system of claim 12, wherein the correlation canceller comprises a field programmable gate array (FPGA).

20. The system of claim 12, wherein the correlation canceller comprises an application specific integrated circuit (ASIC).

21. The system of claim 12, wherein the interference response signals comprise real values.

10

22. The system of claim 12, further comprising:
an epoch aperture correlator operable to perform a correlation operation on a demodulation data signal to generate channel response data, the demodulated data signal based on the filtered communication signal; and
an interference response signal generator operable to receive the channel response data from the epoch aperture correlator and generate and update the interference response signals for use in the correlation canceller.

23. The system of claim 22, wherein the correlation operation of the epoch aperture correlator comprises an autocorrelation of the demodulated data signal over the epoch aperture.

24. The system of claim 22, wherein the correlation operation of the epoch aperture correlator comprises a correlation of the processed data signal and the demodulated data signal over the epoch aperture.

25. A signal processing system, comprising:
a processing subsystem;
a data store subsystem in data communication with the processing subsystem; and
a communications subsystem in data communication with the processing subsystem and data store subsystem;
wherein the communication subsystem is operable to receive as input a plurality of data signals and modulate the data signals over a plurality of channels to generate a processed data signal having a corresponding plurality of communication channels; and
wherein the data store subsystem is operable to store processing instruction data to cause the processing subsystem to access a plurality of interference response signals corresponding to a digital filter transfer function and defining an epoch aperture, and to modulate the processed data signal over the plurality of channels and the epoch aperture prior to digital filtering to generate an inversely correlated data signal.

26. The system of claim 25, wherein the processing subsystem and data store comprise a field programmable gate array (FPGA).

27. The system of claim 25, wherein the processing subsystem and data store comprise an application specification integrated circuit.

28. The system of claim 25, wherein the interference response signals are based on a plurality of channel response signals over the epoch aperture.

29. A system for facilitating digital filtering through a digital filter by a priori conditioning of a communication signal having a plurality of channels, comprising:
means for receiving a plurality of input data signals, for modulating the data signals over a plurality of channels, and for generating a processed data signal having a corresponding plurality of communication channels;
means for storing a plurality of interference response signals defining an epoch aperture and corresponding to a digital filter transfer function and channel responses of the plurality of communication channels, and for modulating the processed data signal over the plurality of channels and the epoch aperture prior to digital filtering to generate an inversely correlated data signal; and
means for digitally filtering the inversely correlated communication signal according to the digital filter transfer function to generate a filtered communication signal.

30. A method of a priori conditioning of a communication signal having a plurality of channels, comprising:
generating a processed data signal;

modulating the processed data signal over an epoch aperture and over the plurality of channels by a plurality of interference response signals to generate an inversely correlated data signal;

modulating and filtering the inversely correlated data signal to generate a filtered communication signal;

demodulating the filtered communication signal to generate a demodulated data signal;

correlating the demodulated data signal to obtain channel response data; and generating and updating the interference response signals based on the channel response data.

31. The method of claim 30, wherein the step of correlating the demodulated data signal comprises correlating the demodulated data signal with the processed data signal.

32. The method of claim 31, wherein the step of correlating the demodulated data signal comprises autocorrelating the demodulated data signal.

* * * * *